Figure 1:
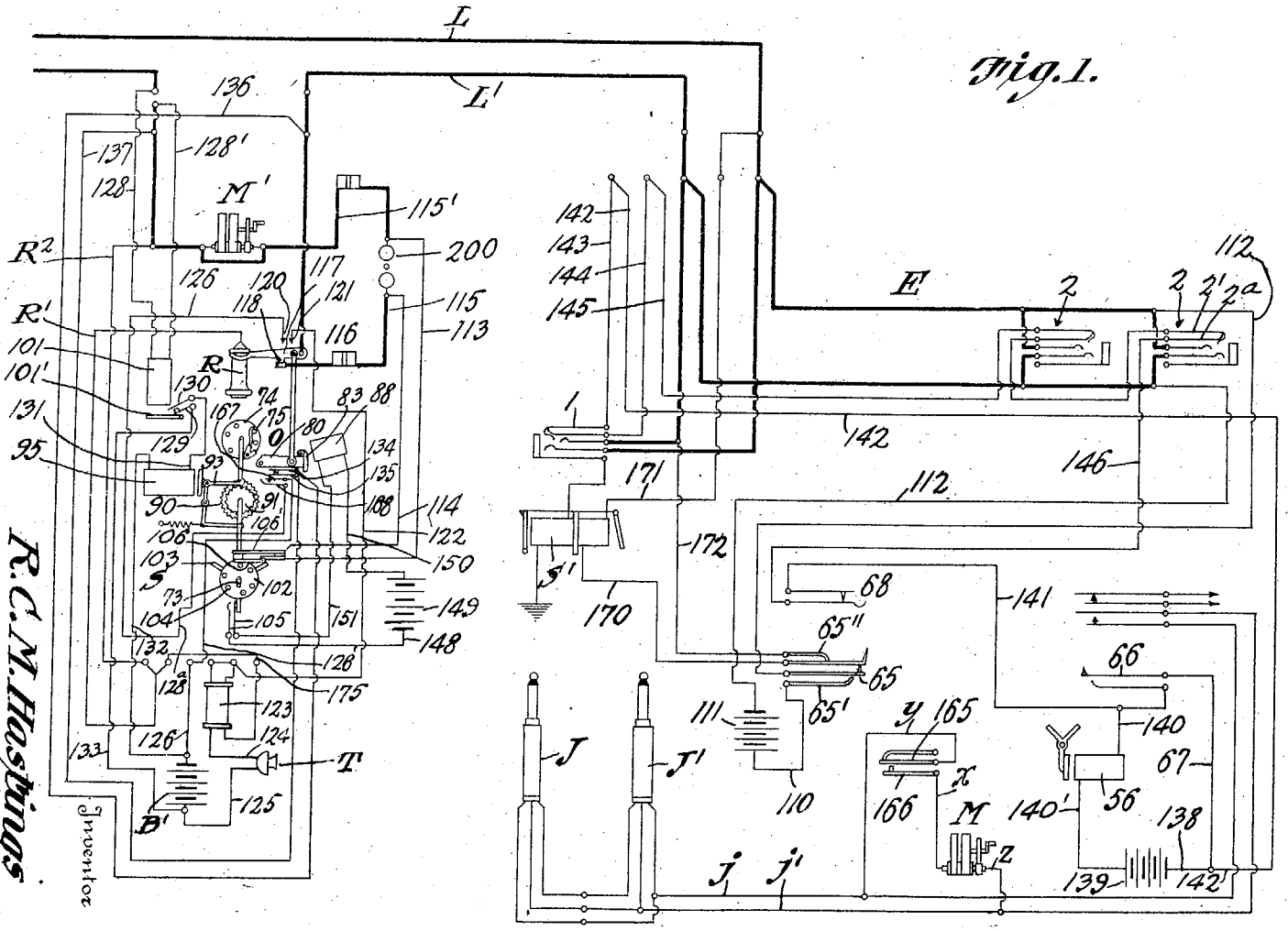

R. C. M. HASTINGS.

SELECTIVE SYSTEM OF TELEPHONY.

APPLICATION FILED MAY 8, 1915.

Reissued Sept. 28, 1915.

13,989.

5 SHEETS—SHEET 1.

R. C. M. HASTINGS.

SELECTIVE SYSTEM OF TELEPHONY.

APPLICATION FILED MAY 8, 1915.

Reissued Sept. 28, 1915.

13,989.

5 SHEETS—SHEET 2.

Inventor

R. C. M. Hastings

By David P. Moore.

Attorney

R. C. M. HASTINGS.
SELECTIVE SYSTEM OF TELEPHONY.
APPLICATION FILED MAY 8, 1915.

Reissued Sept. 28, 1915.

13,989.
5 SHEETS—SHEET 3.

Inventor
R. C. M. Hastings
By David P. Moore
Attorney

R. C. M. HASTINGS.

SELECTIVE SYSTEM OF TELEPHONY.

APPLICATION FILED MAY 8, 1915.

Reissued Sept. 28, 1915.

13,989.

5 SHEETS—SHEET 4.

Inventor

R. C. M. Hastings

By David B. Moore,

Attorney.

R. C. M. HASTINGS.
SELECTIVE SYSTEM OF TELEPHONY.
APPLICATION FILED MAY 8, 1915.
Reissued Sept. 28, 1915.
13,989.
5 SHEETS—SHEET 5.
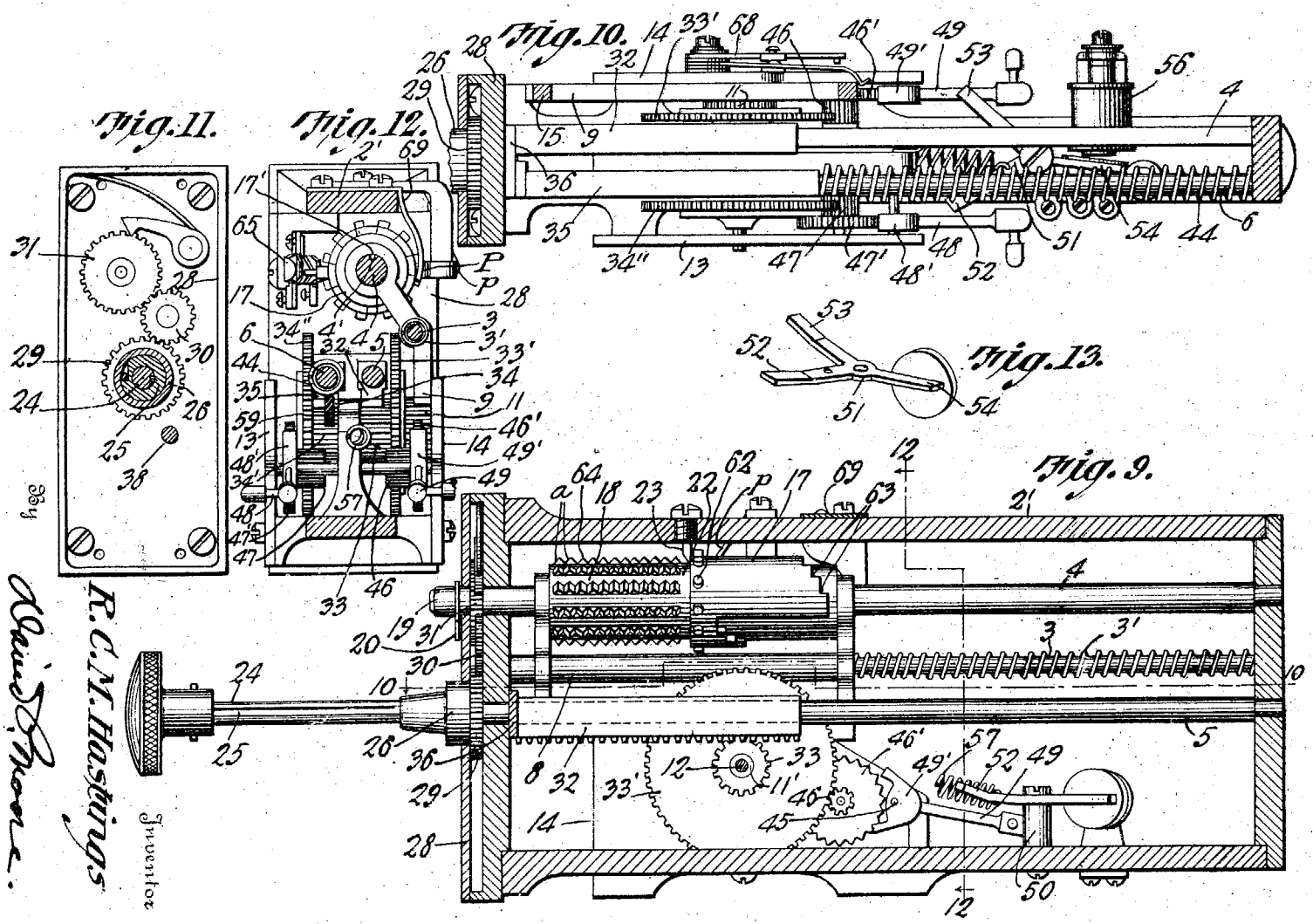
Inventor
R. C. M. Hastings
By David P. Moore.
Attorney

UNITED STATES PATENT OFFICE.

RUBEN C. M. HASTINGS, OF COLUMBUS, OHIO, ASSIGNOR TO THE INTERNATIONAL TELEPHONE CO., OF COLUMBUS, OHIO.

SELECTIVE SYSTEM OF TELEPHONY.

13,989. Specification of Reissued Letters Patent. Reissued Sept. 28, 1915.

Original No. 1,061,285, dated May 13, 1913, Serial No. 646,697. Application for reissue filed May 8, 1915. Serial No. 26,914.

*To all whom it may concern:*

Be it known that I, RUBEN C. M. HASTINGS, a citizen of the United States, residing at Columbus, in the county of Franklin and State of Ohio, have invented a new and useful Selective System of Telephony, (Case A,) of which the following is a specification.

This invention relates to improvements in a selective system of telephony, and the primary object of the invention is the provision of a telephone system, employing an exchange or central station and a series of sub-stations, the same hereafter being illustrated as connected for operation in series in what is termed a loop circuit, there being mounted in the exchange station a selecting apparatus, whereby the operator when called, operates the apparatus to connect the calling sub-station to a called sub-station, simultaneously locking out all other sub-stations, and shunting their outfit, so that their transmitters and receivers are "dead", the circuits being shunted, so that said locked out subscribers cannot interfere with the parties talking, and cannot themselves call the exchange station until such parties have completed their conversation and hung up the respective receivers and rung off; at which time the selecting apparatus in the exchange is automatically operated by the removal of the jack plug, and all sub-stations placed again upon the line in condition for calling the exchange station or themselves being called. In systems of this character, it is generally the common practice of subscribers whether called or not, but when any neighboring subscriber has been called, to be curious and break-in upon the conversation and thereby render the service unsatisfactory for all parties concerned, the manipulation of the various receiver hooks by the curious subscribers causing a great loss to the company on account of the battery consumption, and further requiring the employment of call bells of great resistance, as all of the bells must be operated each time any one of the subscribers is called. With this particular apparatus and system, all of the curious subscribers' instruments are shunted or "dead" during the connection of the calling and called sub-stations, thus cutting out the local battery force, and by reason of the fact that the only bell or signal actuated is the one at the called sub-station, a bell of light resistance, say 80 ohms is possible, may be employed throughout the system. But should the calling and called subscribers endeavor to monopolize the line, the exchange operator can at any time, disconnect the jack and sever the connections between the calling and called sub-stations, so that the other sub-stations may obtain service. In other words, with a system designed according to the present invention any number of sub-stations may be placed in series upon a common line, made in the form of a loop circuit, although it is to be understood that any system may be employed, the loop circuit, however, being a more economical circuit, and one which does not so readily become ineffective, in case of breaks occasioned by storms.

In using the present system, the calling subscriber notifies the exchange station in the usual manner that he desires communication with another substation. The exchange operator answers such subscriber and after being given the number of the sub-station with which it is desired to have communication, the exchange operator rotates a shaft of the selecting apparatus, the indicator thereon indicating all of the various numbers at that exchange station and upon the particular loop circuit. When the exchange operator has manipulated the shaft to such number, the shaft is p shed upon, this action simultaneously placing the called substation in direct connection with the calling substation, and automatically ringing the called substation alarm, and only such alarm, the various other substations having been shunted or caused to be "dead" with relation to the line circuit, so even though should they endeavor to get the exchange station or listen to the conversation, they can neither transmit or receive or signal the exchange station. Should the called subscriber not answer immediately, the exchange operator without affecting the main selecting key, operates an auxiliary device which automatically rings the call-up alarm, and this operation may be continued until the called subscriber either answers or the exchange operator notifies the calling subscriber that the called subscriber does not answer. Upon the completion of the conversation between the called and calling substation, the usual ring-off or in fact any method to notify the exchange station that the conversation is completed, is manipulated, the exchange operator removing the jack plug and thus simultaneously releasing the selecting device so that all substations are connected to the line with the shunts open. It will thus be seen that by producing a system operating as described, that a greater annoyance to the conversing subscribers is dispensed with and overcome, and that by reason of the automatic shunting of all instruments, but the calling and called substations, that a great saving to the company or system is the result.

A still further object of this invention is the employment of a novel form of selecting apparatus, and automatic substation instruments cut or lock out herein set forth to produce an operative system.

With the foregoing and other objects in view which will appear as the description of the invention proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 2:
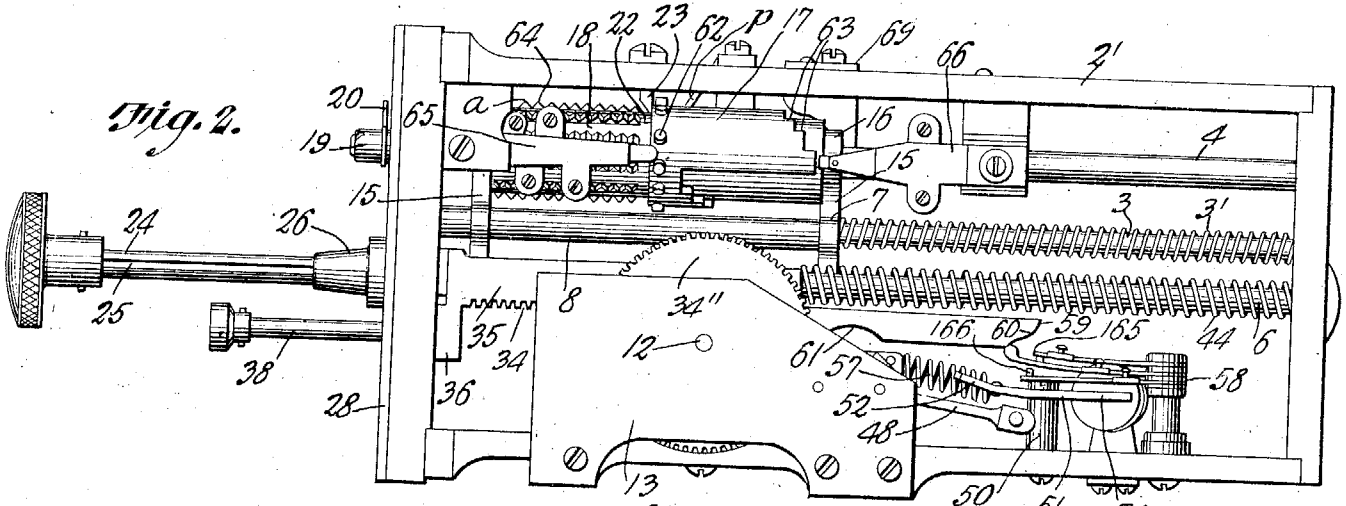
Figure 3:
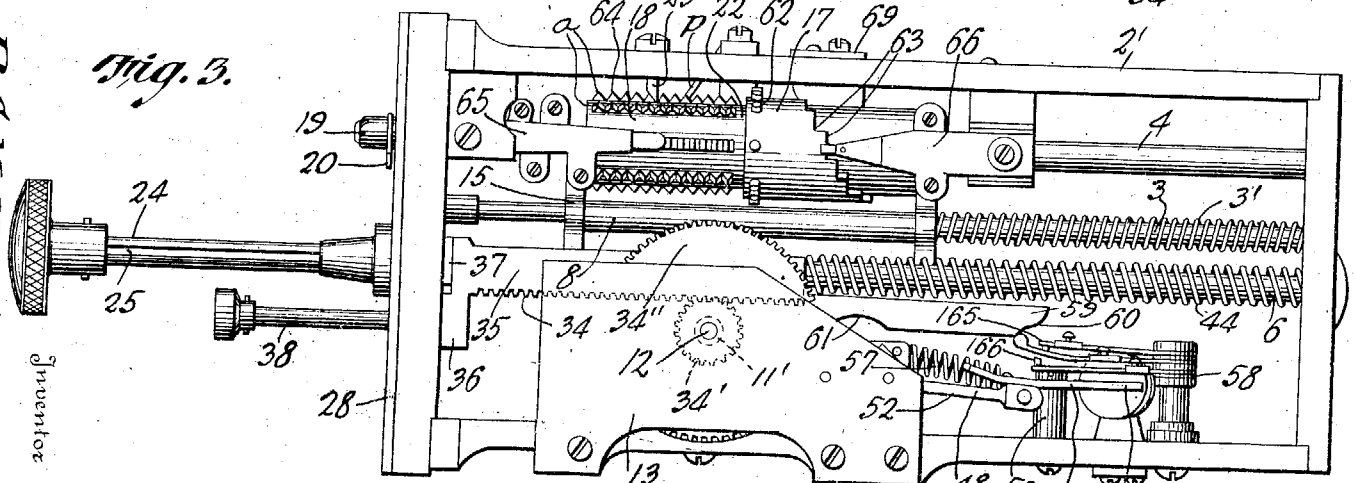
Figure 4:
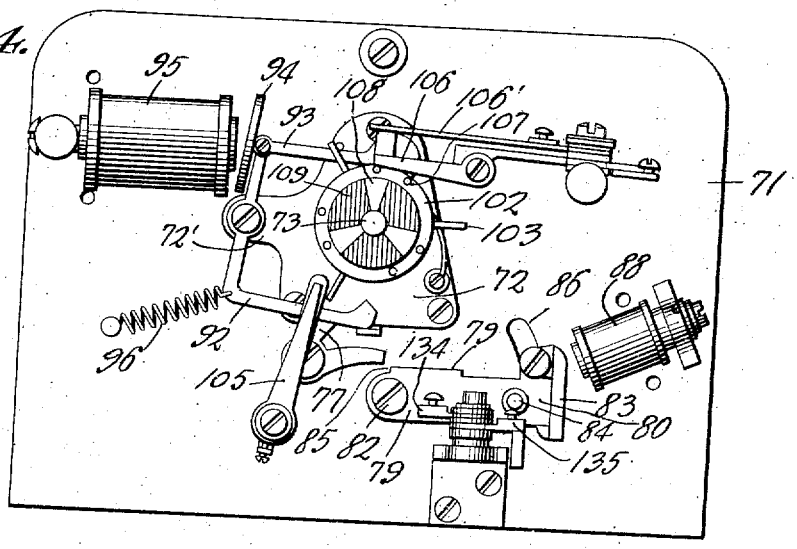
Figure 5:
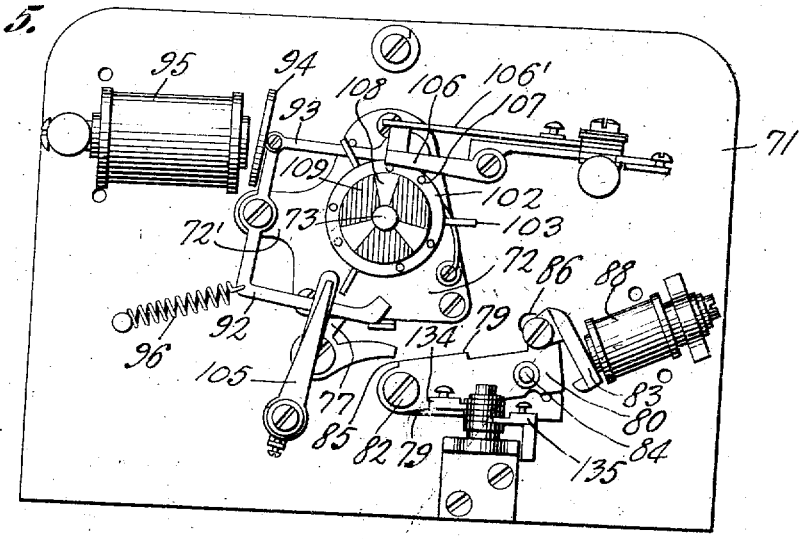
Figures 6, 7, 8:
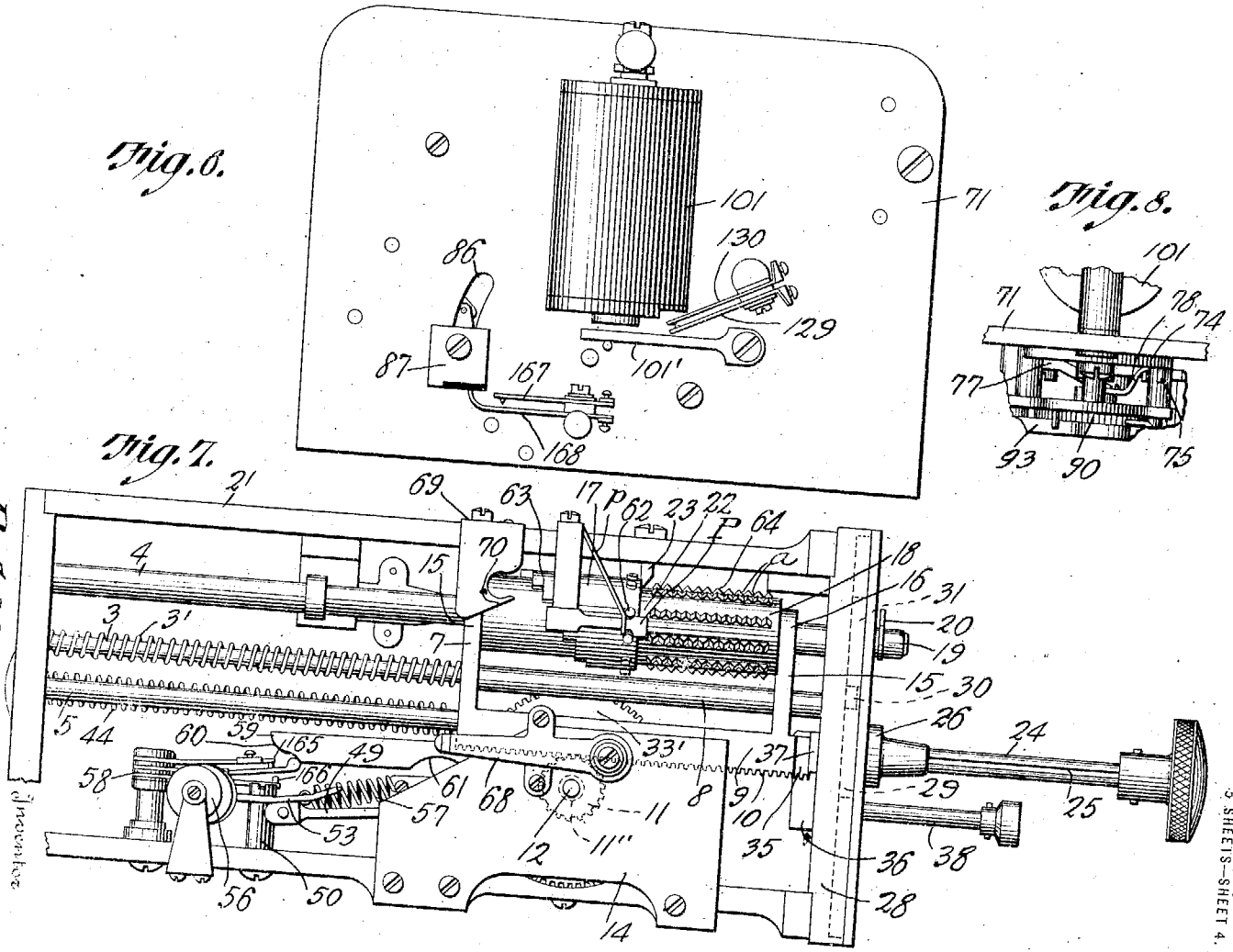

In the drawings: Figure 1 is a diagrammatic view of a single substation and the exchange station as employed with the present invention, the loop circuit being shown. Fig. 2 is a detail side elevation of the selecting apparatus in initial position. Fig. 3 is a similar view with the parts in the position they assume after having called a substation and shunted the ones not called. Fig. 4 is a detail front elevation of a substation shunt mechanism in line open position. Fig. 5 is a similar view shunted, the receiver being off the hook. Fig. 6 is a rear view of the substation shunt mechanism. Fig. 7 is a side elevation taken from the opposite side of the selecting key of Fig. 2, the parts being in the same "initial" position. Fig. 8 is a detail plan view of the hook lock shunt disk and its pawl. Fig. 9 is a vertical longitudinal sectional view through the selecting key. Fig. 10 is a top plan view of the mechanism below the selecting cylinder. Fig. 11 is a front elevation of the key with the cap removed to show the gearing and clutch. Fig. 12 is a section taken on line 12—12 of Fig. 9. Fig. 13 is a detail view of the selecting key control armature.

Referring to the drawings, L and L′ designate the line conductors of a loop circuit, E the exchange or central station, and S one substation, both the exchange station and substation being connected to the loop circuit for the electrical transmission of intelligence.

The various detail circuits as shown in Fig. 1 will be described later on in connection with the apparatus.

The exchange station comprises essentially the call-up magneto M, the two jack plugs J, J′ and the co-acting jack socket 1, for one plug J, and the series of coacting jack sockets 2, for the other jack plug J′. The exchange station visual signal device S′ is mounted also at the exchange station, while the selecting key K is also mounted therein, and as set forth in detail later on controls the electrical communication between two and only two substations, the one calling asking the exchange station to select the one called, whereby the manipulation of the selecting key K by the exchange operator, places in telephonic communication the calling and called substation, and simultaneously shunts all of the remaining substations, simultaneously advising them by visual signal that the line is busy or in use.

The substation S, only one here being shown, it being understood that any number may be connected in the loop circuit, comprises essentially the receiver R and the transmitter T, a call-up and a ring-off magneto M′ and also mounted in proper circuit the synchronously operated lock out and shunting device O, the detail description of which will follow later on. The device O is provided with means operated automatically by the selecting key K at the exchange station to either place the receiver and transmitter into electrical communication in the loop circuit, or to shunt them so that they are "dead" on the line, and cannot in any way by the manipulation of the magneto M′, or the continued movement of the receiver hook annoy the parties in communication, the lock-out or shunting device operating a visual signal 107 to indicate to the subscriber, the condition of the loop circuit, that is whether it is "busy" or free. By this lock-out or shunting device, the local battery B′, is disconnected from the receiver and transmitter in the shunted substation, so that the battery cannot be injured by the continued movement of the receiver hook, as is the case with systems now in use. This much pertains generally to the system, but in order to fully understand the operation of the same, the various instrumentalities that render this system possible must be considered, and each will be considered separately, and then finally associated with the diagram as shown in Fig. 1 to fully set forth their respective uses.

*Selecting key.*—The selecting key, which is particularly set forth in detail in Figs. 2, 3, 7, 9, 10, 11, 12 and 13, and in diagram in Fig. 1, and which is mounted for operation at the exchange station, comprises an open frame 2′ and the four cylindrical guiding and supporting rods 3, 4, 5 and 6, respectively, upon which are mounted the respective parts of the key. Mounted for reciprocatory sliding movement upon the main rod 3, is the carriage 7 having the central tubular portion 8, which forms the mounting for the carriage upon the rod 3. The coiled spring 3′ is mounted upon said rod 3 and exerts a tension to normally move the carriage toward initial position or as viewed in Fig. 2, toward the left. Depending below and parallel to the portion 8, is a plate 9 provided with rack teeth 10, which at all times mesh with the actuating toothed wheel 11, being upon a sleeve 11″, said wheel being rotatably mounted upon the shaft 12 journaled transversely of the frame, between the two plates 13 and 14, which form in reality a casing. Projecting upwardly from and at each end of the tube 8, are two arms 15, which are provided with eyed terminals 16, which slidably fit upon the rod 4, and have disposed therebetween and upon the rotatable rod 4 the selecting cylinder or drum 17, which is keyed slidably upon the rod or shaft 4, so that said cylinder may slide upon the rod or shaft 4 and yet be caused to rotate therewith, the purpose of which will presently appear.

By carefully examining the selecting cylinder or drum 17, it will be noted that the forward portion of the periphery thereof, is provided with a series of longitudinal grooves 18, spaced apart at equidistances around the cylinder, each groove representing one substation and the exchange station in the system, there therefore being when eleven substations comprise the system, twelve grooves 18, the outer end of the shaft or rod 4, as at 19, carrying an indicator or pointer 20 to indicate by pointing to a number on the dial (not shown) the substation that will be placed in communication by the proper manipulation of the key. The outer ends of the grooves 18 terminate in the circumferential groove 22, which when the selecting cylinder is in initial position as in Fig. 2, will have the locking pin or screw 23, mounted in the frame above the cylinder, fitting therein to prevent the movement of the cylinder accidentally and yet permit the cylinder to be pushed inwardly to connecting position, as shown in Fig. 3 through the rotation for selecting and the pushing inwardly of the operating rod 24. The rod 24 is provided with a key way 25, which permits said push rod to be rotated freely to the right, but when turned to the left throws in the pawl and ratchet device 26, shown in Fig. 11, so that the shaft 24 through the gear 29, small pinion 30 and gear 31, as clearly shown in Figs. 9 and 11 will operate the rotatable rod 4 and thereby cause a simultaneous rotation of the selecting cylinder or drum 17. Upon the shaft 12 are rotatably mounted the short sleeves 11′ and 11″, the sleeve 11′ of which carries a gear 34′ and the outer large gear 34″, while the sleeve 11″ carries the outer small gear 11, the intermediate large gear 33′ and the inner small gear 33. Thus the sleeve 11′ is independent of the sleeve 11″, and the sleeve 11′ constitutes the automatic ringer controlling sleeve, while the sleeve 11″ constitutes the selecting key carriage and cylinder controlling sleeve. By this arrangement when the pointer alines with any one of the dial figures, the push rod 24 is pushed inwardly, so as to slide upon the central guide rod 5, upon which is slidably mounted the main actuating rack or tooth bar 32, whose toothed portions is in mesh at all times with the gear 33.

The inward movement of the bar 32 rotates the sleeve 11″, and as the call alarm actuating frame 35 is simultaneously pushed inwardly, the toothed portion or rack 34 thereof rotates the sleeve 11′ through the small gear 34′. The large gears 33′ and 34″ are a portion of a locking and releasing mechanism for the control and release of the respective racks 10, 32 and 34, the electromagnet 56 and its Y-shaped armature 51, as will presently appear, constituting the main control device for permitting the return to initial position of the racks 10, 32 and 34 and for the retention thereof in selected position. At the forward end of the frame 35, are the two lugs 36 and 37, the lug 36 depending and in the path of to be abutted by the inner end of the auxiliary push rod 38, while the lug 37 is to the side of the frame 35 and in the path of to be actuated by the push rod 24. By this means, when the push rod 24 is pushed upon, the lug 37 is engaged and the frame 35 is moved inwardly with the carriage of the key, but after the carriage is in selected position and is locked, the frame 35, due to the spring 44, is automatically returned to initial position, and during such return, as will presently appear, automatically causes the energization of the call-up alarm 200 in a selected substation. If the selected substation requires successive calling, the auxiliary push rod 38 is depressed, engaging the lug 36 and pushing only the frame 35, which after having been released will be again automatically returned by the spring 44 and will ring the alarm 200 in the selected substation.

Journaled between the plates 13 and 14 and to the right of the shaft 12, as viewed in Figs. 2, 3, 9 and 10, is a shaft 45 having rotatable thereon the two gears 46 and 47, which are at all times in mesh with the respective large gears 33′ and 34″. Fast with the gear 46 is a toothed wheel 46′, while fast with the gear 47 is a toothed wheel 47′. The respective pivotally mounted governor arms 48 and 49, carry the respective double detents or pawls 48′ and 49′, which engage their respective toothed wheels 47′ and 46′, such arms and the train of gears constituting the full locking and releasing mechanism for the frames 9, 32 and 35.

As the manipulation of the carriage and selecting cylinder makes the selection and line connection, it is desirable that the frame 35 be held stationary during the spring actuation or movement of the same, and vice versa, that is that the carriage and selecting cylinder be locked while the frame 35 is being automatically actuated to actuate the call-up mechanism of the selected substation; and to accomplish this, a very simple, yet, effective device is employed. This consists primarily of the pin 50, mounted in the main frame centrally of the bottom thereof and to the right as viewed in Figs. 2, 3 and 9, and having pivoted at its top a Y-shaped armature 51 having the terminals 52, 53 and 54.

The terminal 52 is disposed to move above the governor arm 48, while the terminal 53 is disposed to move above the governor arm 49, this action alternating, so that one governor arm is held against movement, while the other is released. This is accomplished by the spring 57 and the electromagnet 56. Thus the energization of the electromagnet 56, will act in opposition to the spring 57 to attract the armature 54, and consequently move the terminal 52 into engagement with the governor arm 48, while the terminal 53 will be moved from above and out of engagement with the governor arm 49.

When the exchange operator is making a selection, and the push rod 24 has been pushed in to its fullest limit and released, the contact 66 due to the engagement thereof is closed by the cylinder 17 and consequently the elecromagnet 56 is energized. This energization of the electromagnet 56 as above stated attracts the armature 54 and places the terminal 52 into engagement with the governor arm 48, while the terminal 52 is moved from engagement with the governor arm 49, the governor arm 49 being free to move and consequently permits the retraction of the carriage and cylinder 17 to the selected position, at which time the contact 66 due to the shouldered portion 63 of the cylinder 17 is caused to separate and open the circuit to the electromagnet 56, such deënergization releasing the armature 54 to the action of the spring 57, so that the terminals 52 and 53 are reversed, the terminal 52 being disengaged from the arm 48 while the terminal 53 is placed in engagement with the arm 49. This action releases the bell ringer frame 35 so that the arm 59 is moved to close the contacts 165 and 166 to thus automatically actuate the audible alarm in the called substation.

Disposed near the electromagnet 56 are the call-up alarm circuit forming spring terminals 165 and 166, the upper one of which is disposed in the path of and adapted to be actuated by the arm 59 of insulation carried by the frame 35, and provided with the reduced end 60 and the notch 61 intermediate of its ends, the same being provided to permit the call-up terminal to be separated and the line open when adjacent the end 60 or notch 61, and to be closed when in between.

Mounted upon the enlarged portion of and exteriorly of the cylinder 17, beyond the circumferential groove 22 thereof, are the studs or pins 62, one to each longitudinal groove 18 of the cylinder, and formed upon the extreme inner end of the cylinder are the staggered shoulders 63, one to each pin 62 and groove 18, and each in line with its respective pin and groove. The ribs 64 formed by these series of longitudinal grooves 18 in the cylinder are each provided with a series *a* of teeth, one to each subscriber. All of the teeth are cut in circumferential alinement, said teeth forming a circuit making and breaking to operate the shunting devices in the system, the coacting spring contact terminal 65 being disposed to engage the teeth of one rib at a time, as shown in Fig. 3, and the specific purposes of which will be set forth in the operation later on. Disposed in the path of the staggered shoulders 63 of the selecting cylinder, is another pair of coacting spring terminals 66. A conductor 67, through the conductor 138, battery 139, conductor 140′, electromagnet 56, and conductor 140 connects one terminal of the pair of contacts to the electromagnet 56, another connector 141 being branched from the conductor 140 and connected to one terminal of the other pair of terminals 68, which are disposed upon the plate 14, and in the path to be closed and opened by the actuation of the plate 9 of the carriage, the purpose of which will presently appear. Connected to the top of the frame of the key is a bracket 69, whose hooked lug 70 projects downwardly and in the path to engage between the pins 62, and insure upon the extreme inward movement of the selecting cylinder, the proper registering of the longitudinal grooves with the locking and guide screw or pin 23, thus insuring the proper registering of the cylinder in case the pointer did not exactly point to the proper dial number when the operator pushed the rod 24.

The pawl P is properly carried by the frame and has its engaging end disposed to ride in one longitudinal groove 18 or engage one set or row of teeth *a* at a time, the spring *p* holding the same toward the cylinder 17 at all times. This pawl P is so disposed as to permit the cylinder 17 movement toward initial position when in engagement with the teeth *a*, but prevents the inward pushing of the cylinder, the purpose and operation of which will be set forth later on.

*Subscriber's lock-out and shunting device.*—This device, which is shown mounted in diagram in Fig. 1, and in detail in Figs. 4, 5, 6 and 8, consists primarily of the main supporting plate 71, having journaled therein and in the auxiliary plate 72, a shaft 73, which carries thereon the shunt or receiver hook lock disk 74, provided with the series of pins 75, which correspond in number to the grooves 18 in the selecting cylinder 17, said pins forming operating means to control the receiver hook 117 for the shunt connections, as will presently appear. It is to be understood that although pins 75 are here shown, that grooves, or other projections may be used, and that there must be as many pins as there are figures on the dial of the selecting key. The pins 75 control the pawl 77, which is secured to the plate 71, by any well-known means, and is provided at one end with the spring 78, which is adapted to contact the pin 75, to raise the pawl 77 from engagement with the notch of the receiver hook lock or shunt controller 79, which is formed in two parts or arms 80 and 81 and is secured to the plate 71 by the post 82. Secured to the controller 79, is an armature 83, said armature being provided to release the part 81 to locking position. Carried by the part 80 of the controller, is a pin 84, and a notch 85, which is adapted to receive the pawl 77, so that the controller may be locked and thus hold the receiver hook in shunted position.

By the rotation of the plate or disk 74, the pawl is actuated to be raised or lowered from engagement with the notch 85, thus when the line is free, the pawl is out of engagement or when the substation is called, but when two substations are in communication, the pawl 77 of the remaining substations are each in its respective notch 85 of the controller and the line is "dead" to them, as their transmitters and receivers are shunted from the line.

Mounted through a slot 86 in the plate 71 and upon the opposite side to the controller, is a weight 87, which is connected to the free end of the part or arm 81, and which when the controller is lifted, the pawl 77 being disengaged therefrom, and the electromagnet 88 being energized, attracting the armature 83 and pulling it outwardly so that its lower end is disengaged from the weighted end of the part or arm 81, will cause the arm 81 to fall by gravity and engage the pair of terminals 134—135, shunting the transmitter and receiver of this set from the loop circuit, and at the same time opening the line of the transmitter and receiver to the battery, this particular action taking place when a party has rung into the exchange station and another party has just beaten them there, thus providing a means should a receiver be taken off or be off at that instant, that the exchange operator may select the called substation and place the calling substation in the proper line connection, shunting the substation whose receiver is off the hook. The main shaft 73 also carries two ratchet wheels 90 and 91, respectively, one of which is an actuating ratchet and the other of which is a retrograde movement preventing ratchet, and disposed to operate upon these ratchet to impart to the shaft 73 and the disk 74 the proper rotation, is the bell crank lever pawl 92, which is pivoted to the arm 72′ of the auxiliary plate 72, and has pivoted to its upper free end the pawl 93, the pawl 93 operating to rotate the shaft and disk, while the pawl 92 operates to prevent its moving too far or retrograding. In order to prevent the retrograde movement of the shaft 73 when the pawl 93 has been partly moved to grip a new tooth of the ratchet wheel, the member 92 being not yet engaged with said ratchet wheel, a spring 73′ is provided, as clearly shown in Figs. 4, 5 and 8, said spring 73′ being disposed to engage the ratchet wheel and at the same time act as a slight retarding means to prevent the overrunning action of the shaft 73 in the desired direction. In order to operate these two pawls simultaneously to operate the shaft, an armature 94 is connected to the end of the pawl 92 at its connection with the pawl 93, so that the energizing of the electromagnet 95 will pull upon the pawl 93 and cause the pawl 92 to be pushed and lifted, the pawl 93 engaging the ratchet 90 to rotate the shaft, and the pawl 92 engaging the ratchet 91 to prevent the shaft moving too far or retrograding, a spring 96 being employed to return the pawls upon the deënergization of the magnet 95. By making and breaking the contacts 65—65′ by the teeth *a* upon the selecting cylinder, the electromagnets 101 and 95 are energized, as will later appear, and the shaft 73 and disk 74 are operated in synchronism or in step with the movement of the teeth *a* and thus the selected substation is permitted a line connection, and the remaining receivers and transmitters are shunted from the line, and are "dead".

The electromagnet 95 is energized by a storage battery B′ while the electromagnet 101 is energized by the main transmission battery 111, but as herein shown, the electromagnet 95 is controlled through the contacts 129 and 130, controlled by the main electromagnet or relay 101, disposed upon the rear of the plate 71 and connected in the talking circuit, the energizing of the electromagnet 101 closing the contacts 129 and 130 and closing the battery circuit of the battery B′ to energize the electromagnet 95 and operate the shunting and lock-out mechanism.

The shaft 73 further carries a disk 102 having a set of peripheral pins 103, here shown three in number, and a set of outwardly projecting facial pins 104, which are six in number and are disposed intermediate of the respective peripheral pins 103. The pins 103 are employed to operate the circuit containing the electromagnet 88 through the spring terminal contacts 105, while the pins 104 are adapted to engage and operate the spring terminal contacts 106 which when closed form a shunt circuit with the call-up alarm 200. The contacts 105 provide an auxiliary means for energizing the electromagnet 88, to release the arm 81, to produce a shunt and open the local battery circuit, should the subscriber neglect to hang up his receiver after his conversation is ended.

In order to provide a visual signal or indicator to advise the subscriber that the line is free or busy, there is mounted upon the extreme end of the shaft 73 and in view of the subscriber a signal disk 107, which is provided with three series of two colored portions 108 and 109, as shown in Figs. 4 and 5, a red color indicating "busy" and white "free." By this means, the subscriber may be notified when he may expect to get the exchange station for communication, or even in the event that he should have taken the receiver off of the hook, during the selecting of a called substation by the exchange station, or the receiver was off the hook, the visual signal will indicate at a glance that the line is busy and that the received and transmitter is shunted from the line and are in reality "dead."

*The operation of the system.*—To fully set forth the operation of the system we will suppose that the calling subscriber has requested the exchange operator for substation #5. The operator now rotates the push rod 24 to the left, operating the pawl and ratchet clutch so that the selecting cylinder is rotated, and when the dial indicates #5, the rod 24 is ready to be pushed upon. The rod 24 is now pushed upon carrying with it the carriage and selecting cylinder and also the ringer frame 35, the electromagnet 56 now being energized due to the closure of the springs 66 by the carriage, the armature is attracted against the spring 57, so that the terminal 52 is placed above the governor arm 48 and the frame 55 is locked. Upon the release of the rod 24, however, the spring 3′ returns the cylinder and carriage to selected position, at which point the springs 66 are released and the electromagnet 56 is deënergized, its armature being released to the spring 57. The terminal 52 is now disengaged from the governor arm 48, while the terminal 53 is placed in engagement with the governor arm 49, thus freeing the frame 35 to its spring 44, while locking the gears 11 and 33 against movement and consequently holding the cylinder and carriage at selected position. During the movement of the carriage and cylinder, that is, when the electromagnet 56 is energized and before its deënergization, the teeth *a* and the contacts 65—65′ are brought into play. This action causes the teeth *a* to actuate the contact 65 and thus energize the respective electromagnets 101 and 95, so that the shaft 73 in all of the substations are rotated, the carriage and selecting cylinder being halted when the staggered portion or the proper shoulder 63 has permitted the terminals 66 to separate, at which time, the circuit including the battery 139, terminals 66 and electromagnet 56 is broken, and the electromagnet 56 is deënergized, permitting the spring 57 to pull the terminal 52 out of engagement with the governor arm 48, and engaging the terminal 53 with the governor arm 49, so that the frame 35 is actuated by its spring and is moved to the opposite end of the main frame ringing the call-up alarm 200 in the selected substation. Should the selected subscriber not reply at once, the exchange operator manipulates the auxiliary push rod 38 pushing in the frame 35, which again when released will act as above and either close the call-up circuit to permit a magneto M to be operated to actuate the call-up alarm, or throw into the line any well known call-up mechanism. By this means it will be seen that the entire selecting operation is controlled by the exchange operator and that the carriage and selecting cylinder will remain in this selected position, as shown in Fig. 3, and cannot be changed by the exchange operator by the manipulation of the push rod 24, due to the locking pawl P and its retaining spring *p*, which is carried by the frame and disposed to engage the teeth *a* of the cylinder, either by pushing or rotating as the selecting cylinder is locked against further inward movement by the pawl P and against further rotation by means of the pin 23. The only way it can possibly be changed is by the removal of the jack plug J, at which time the electromagnet 56 is energized and the carriage governor arm 49 is released to permit the carriage and selecting cylinder to return to initial position, Fig. 2. Should the subscribers impose upon the exchange operator, this action may be taken but as the exchange operator can hear the conversation and therefore knows when it is completed, the jack plug J is removed and the various other substations are placed in line connection, the recession of the carriage and cylinder automatically operating the terminals 65 to actuate the lock out and shunting devices throughout the system, placing all stations in condition to obtain the exchange station and operating the visual indicator to indicate such condition.

When the carriage and selecting cylinder are first pushed in, the teeth *a* are not in line with the contact terminal 65, but as the pin 62 upon the cirmumference of the selecting cylinder are engaged by the guide hook 70, depending from the main frame, the selecting cylinder is given a slight turn, so that the indicator would point half way between the number selected and the next succeeding one, that is, if #5 is selected, the indicator would point half way between #5 and #6, thus placing the teeth *a* in line with the terminal contacts 65 and the locking pawl P so that any recession of the cylinder will actuate the contacts 65 to operate in synchronism the various lock-out and shunting devices in the system, to be halted when the proper set or substation is in line connection and ready to be signaled.

The selecting cylinder, when ready to be pushed in, has a space between two rows of teeth *a* disposed to aline with the lower end of the pin 23, said pin being of considerably less width than the space, while the spring actuated pawl P, which is of substantially the same width as the space, is also disposed in line with a space between two rows of the teeth *a*. Thus when the cylinder is pushed in, it will be properly guided by the pawl P and when at the end of the stroke and the pin is engaged with the hook 70, the cylinder will have a slight rotation imparted thereto, such slight rotation placing a row of teeth *a* in line to engage the pawl P, but not sufficiently far to move the space out of alinement with the pin 23. Thus the pawl P will lock the cylinder against a further pushing movement, while the arm 53 will lock the arm 49 due to the spring 57 so that the cylinder is locked against retraction. Thus the exchange operator cannot by mistake change the talking circuit by attempting to move the selector through the movement of the push rod 24 so that any other, but the substation selected, may be thrown in the line. The selector cannot therefore be adjusted by the exchange operator either by mistake or wilfully, until the jack plug J is removed and the carriage and selecting cylinder are returned to initial position. As soon as the conversation is thro gh, or central operator chooses to take possession of the line, the jack plug J is removed from its socket, thus completing the circuit through the conductors 67 and 138, battery 129, conductor 140′, electromagnet 56, and conductor 140 to the spring contacts 66, the electromagnet 56 being energized to release the carriage and selecting cylinder release escapement, bringing all instruments to line connected and the selecting instrument to initial or zero position.

In order that the various circuits may be traced in the diagram as illustrated in Fig. 1, to demonstrate the full operation of the present system, although it is to be understood that other forms of circuits may be employed with the present selecting key and lock-out device, the circuits will be traced in rotation or in their correct order beginning with the calling of the operator or the exchange station and the answering of such call by the operator, and to the final restoration of the various stations to the main line.

With the various instruments in the positions illustrated in Fig. 1, the contacts 65—65′; are closed so that the signal S′ is connected to the line conductors L—L′ through the respective conductors 170, 171 and 172, so that all substations are in calling connection with the exchange station E. Thus the line will be connected so that the exchange station can be called by any one of the substations.

Presupposing that a subscriber desires to call the exchange station, the receiver is not removed from the hook 117, but the magneto M′ at the substation is actuated to energize the exchange signal S′ to indicate to the exchange operator that a calling substation desires to be connected with a selected substation. Should the magneto M′ be dispensed with, the local battery B′ of the substation will be connected to the line through the elevation of the receiver hook 117 and the contacts 120 and 121, thus bringing into the line the transmitter T and the receiver R with the local battery B′ which will energize, in short lines, the signal S′, and give such indication to the exchange operator. The circuit closed when the receiver hook 117 is raised, is as follows: The contact point 121, the coil 123, the conductor 124, transmitter T, conductor 125, battery B′, conductors 126′—126, the contact 167—168, the conductor 126ª, the contact 120, and the receiver hook 117.

Assuming that the calling substation desires to converse with a subscriber, as for instance #5, the exchange operator now inserts the jack plug J in the socket 2, this action opening the contacts 2′—2ª. Push rod 24 of the selecting key K is now rotated until the indicator indicates #5, at which time the push rod is pushed upon and during such action the contacts 66, due to the engagement thereof with the enlarged portion of the cylinder 17, are closed and before the release of the key actuating rod 24, a circuit is closed at 66 and includes one contact 66, the conductors 67 and 138, the battery 139, the conductor 140′, the electromagnet 56, the conductor 140 and the other contact 66. Thus the electromagnet 56 is energized and attracts the armature 51 to place the arm 52 above and in engagement with the arm 48 to lock the automatic ringer frame 35 against release. At the same time that the cylinder 17 and the frame 9 is moved inwardly, the normally open contacts 68 are engaged by the frame 9 and close it, but as contacts 2′—2ᵃ of the socket 2 are held open by the jack plug J, the electromagnet 56, as will later appear, is not effected now by the contacts 68.

As before stated, previous to the cylinder 17 having reached its full limit of movement, the hook 70 engages the pin 72 and thus rotates the cylinder 17 to bring a single row of teeth *a* in line with the pawl P, and the pawl due to its spring *p* locks the cylinder against further inward movement and permits the same to retract to the selected tooth *a* of the row, while at the opposite side of the cylinder another row of teeth *a* is disposed to engage the contact 65 and thus close the talking circuit and intermittently open and close another circuit, as will presently appear. When the contact 65 is in the depression between the teeth *a* the closure is made between the contact 65 and the terminal 65″, while when the contact 65 is riding upon one tooth *a* the contact is open at 65″ and closed at 65′, thus intermittently and alternately forming a talking connection and connecting the battery 111 to the line.

The release of the push rod 24, due to the spring 3′ moves the cylinder 17 and frame 9 toward the initial position, and as the contacts 66 are closed by the enlarged portion of the cylinder 17, the circuit controlling the electromagnet 56 is energized until the opening of said contacts 56, due to the snapping of the contacts from one of the staggered portions 63 of the cylinder 17. The opening of the circuit thus described, permits the spring 57 to hold the arm 53 above the arm 49, and thus lock the arm 49 to hold the cylinder 17 and carriage 7 locking against further movement toward initial position. As the cylinder 17 is moved toward initial position and before being stopped by the arm 53, the teeth *a* engaging the contacts 65 moves the same to intermittently close and open the contacts at 65 and 65″ and intermittently open and close the contacts at 65 and 65″ and alternately and intermittently open and close the contacts 65—65′. This action throws into the line the battery 111, so that the various shafts 73 in all of the substations are operated synchronously, to lock out all uncalled substations and place into line connection a single called substation.

The circuit closed to lock out the uncalled substations and connect to the line the called substations, is as follows: The contacts 65—65′, the conductor 110, the battery 111, the conductor 112, the line conductor L′, the receiver hook 117, the contact 118, the conductor 115, the conductor 114, the two closed contacts 106′—106, the conductor 113 through the portion of the line L′, as indicated in Fig. 1 of the substation, the conductor 128′, the electromagnet 101, the conductor 128, and the line L, thus intermittently energizing the electromagnet 101 in all substations. The energization of each electromagnet 101 operates the armature 101′ in each substation and thus causes the contacts 129—130 to intermittently close the circuit including the electromagnet 95 to each substation. This circuit includes the contacts 129—130, the conductor 131, the electromagnet 95, the conductor 132, the battery B′, and the conductor 133. Thus the intermittent energization of the electromagnet 95 in each substation will operate the armature 94 to step the shaft 73 and the disk 102. The disk 103 in the uncalled substation will be moved to indicate "red", if the line is busy. At this stage in each uncalled substation, the receiver hook is locked, and the uncalled substations shunted from the line by reason of the lever 80 being locked in down position by the lock 77 engaging the notch 85. At the same time, the contacts 134—135 are closed by the lever 80 in such condition as to shunt the uncalled substation from the line L—L′ through the conductor 136, contacts 134—135 and the conductor 137. As the uncalled substations' receiver hooks are thus locked, it is impossible for the same to be released by lifting the receiver, and the conductor 136, the contacts 134—135 and the conductor 137 complete a shunt around the substation. The substation is thus shunted from the line. Also as the pin 104 in the uncalled substation is out of contact with the contacts 106 the bell 200 in each uncalled substation is held inoperative and will not be affected as the bell 200 is actuated in the called substation.

When the cylinder 17 is stopped in its movement, due to the contacts 66 being open by slipping from engagement with the shoulder 63, the electromagnet 56 will be deenergized and will permit the spring 57 to move and hold the armature 51. At this time, the arm 52 releases the arm 48 to the action of the spring 44, and the spring 44 moves the call-up alarm frame 35 to initial position, so that the contacts 165—166 controlled by the arm 59 of insulation are held open, due to the positioning of the ends of the contacts 165 in the recess 61 of the bar 69. Thus the movement of the frame 35 and the bar 59 will cause the lower edge of the bar 59 to ride over and press the contact 165 to engage the contact 166 and thus throw into line the call-up machine M of the system. By this means the call-up machine, which may be operated at all times, or when desired, is thrown into the line through the conductors $z$ and $x$, the contacts 166 and 165, and the conductor $y$ to energize the call-up alarm 200 in the called substation. The period of such ringing of the call-up alarm 200 depends upon the length of the bar 59 and until its curved end 61 passes over the contact 166.

Should the contact 165 be raised and separated from the contact 166, the call-up machine M is cut from the line.

Should the called subscriber not respond within reasonable time, the exchange operator will press upon the rod 38 and consequently the bar 59 will be moved inwardly and as the rod 38 is released, the spring 44, as before described, will move the frame 35 to initial position and thus again cause the actuation of the call-up alarm 200 in the called sub-station.

The call-up alarm circuit energized by the call-up machine M when the contacts 165—166 are closed is as follows:—The conductor $z$, the machine M, the conductor $x$, the contacts 166—165 the conductor $y$, the conductor $j$, of the jack plug J, the socket 2, the line L′, the receiver hook 117, in the called substation, the contact 118, the conductor 115, the call-up alarm 200, the conductor 115′, the conductor 128′, the coil 101, which is ineffective to the current from the machine M, the conductor 128, the remainder of the line L′, the conductor 136, the closed shunt contacts 134 and 135 of the shunted substations, the line L, back to the socket 2, at the exchange station, the jack plug J, and the conductor $j'$.

As the locking lever 77 in the called substation is raised so as not to be in the path to engage the notch 85 of the arm 80, the receiver hook thereof, when the receiver has been removed therefrom, will automatically rise and thus open the contacts at 117—118 and bridge the contacts 120 and 121 and thus throw into the line the local battery circuit of the called substation so that the called substation and the calling substation will be placed in connection with the line wires L and L′.

At the end of the conversation the exchange operator removes the jack plug J, and permits the contacts 2′—2ª to close and as the contacts 68 are closed, due to the frame 9 of the selecting key engaging them, the circuit including the electromagnet is closed and thus the armature 51 is moved in opposition to the spring 57 to remove the arm 53 from engagement with the arm 49. This action will release the carriage and move the cylinder 17 under the action of the spring 3′, so that the cylinder is moved, as for instance, from the position shown in Fig. 3 to that shown in Fig. 2. During this movement, the teeth $a$ are in engagement with the contact 65 and will intermittently open and close the contacts 65″ and 65 and thus throw into the line the battery 111, which as before described will actuate all of the magnets 101 in every substation to automatically operate the shaft 17, the electromagnets 95, and armatures 94, so that the disks 102 will be placed in normal position to indicate that the line is free and that the exchange station can be called by all substations. At this time all of the hooks 117 can be raised, as the locking lever 77 is in raised position and out of the path to engage the notch 85 of the various arms 80.

In the event that a receiver in any set is left off of the hook 117 such hook is consequently raised to permit contact 134—135 to be opened, with contacts 167—168 closed, and the arm 80 due to the armature catch 83 will have carried with it the arm 81. Now, as the shafts 73 are rotated, as before described, during the selection of the called substation, the pin 103 carried by the disk 102 will engage the contacts 105 in each substation, thus closing a circuit to energize the electromagnet 88. Thus in the substation where the hook 117 is raised, the armature catch 83 will be moved to the position as shown in Fig. 5, and should this be an uncalled substation, this substation will be shunted from the line by the closure of the contacts 134—135 and the opening of the contacts 167—168, due to the falling thereupon of the arm 81. This circuit is as follows:—The contacts 105, the conductor 151, the electromagnet 88, conductor 150, battery 149, and conductor 148, thus energizing the electromagnet 88 to attract the armature catch 83, as above described, to release the arm 81, which due to gravity will fall to close the contacts 134—135, thus shunting the substation from the line.

As before stated, the contacts 167—168 are held opened by the arm 81 when down, and by this arrangement it is evident that the local battery B′ is saved should the receiver R be purposely or accidentally left off of the hook.

The circuit traced through the calling substation to the exchange station is as follows:—Assuming the selecting key to be at zero position, and therefore the shunts at 134—135 at each substation open, and thus all substations connected to the line for calling the exchange station, and that a substation desires to call the exchange station, the magneto M′ is operated and the signal S′ at the exchange station is energized as is the usual practice, and the exchange operator upon noticing these signals will insert the answering jack plug. The calling subscriber now removes the receiver from the hook 117 so that the hook rises and bridges the contacts 120—121.

The circuit with the exchange and the calling substation is as follows:—The answering jack socket 1, closed by the answering jack plug J′ at the exchange station, the line L′, the hook 117 of the calling substation, the conductor 122, the coil 123, the conductor 175, the receiver cord R′, the receiver R, the conductor $R^2$, the portion of the line L′ to which the conductor $R^2$ connects, the conductor 128′, the coil 101, the conductor 128, and the line L to the exchange station. Thus the receiver is connected to the line, so that the exchange operator can ask the substation the desired substation to which the calling substation desires connection. Simultaneously, with the removal of the receiver R from the hook 117 in the calling substation, the transmitter T is connected to the line as follows:—the socket 1, the line L′, the hook 117, the contacts 120—121, the conductor 122, the coil 123, the conductor 124, the transmitter T, the conductor 125, the battery B; the conductor 126, the conductor 126′, the closed contacts 167—168, the conductor $126^a$ back to the contact 120, the hook 117, the portion of the line L′, the conductor 128, the coil 101, the conductor 128′, and the line L to the socket 1 at the exchange station. The exchange station and the calling substation are now properly connected and the exchange operator, while the calling subscriber holds the receiver off of the hook 117, and is placed into communication by the exchange operator, who manipulates the selecting key as before described, will be placed into communication with the called substation.

The manipulation of the selecting key operates the lock-out devices in the uncalled substations, so that the receiver hooks are locked and the shunt connection at the uncalled substations are closed, thus shunting the complete uncalled substations from the line.

The circuit for energizing the various lockout devices in the different substations, even including the called substation are as follows:—The contacts 65—65′, the conductor 110, the battery 111, the conductor 112, the line conductor L′, the conductor 128′, in all substations, the electro magnets 101, the conductor 128, and the line L, this circuit energizing all the electro magnets 101 which in turn attract their respective armatures 101′ and close the contacts 129—130 in each substation to intermittently close and open a circuit including the electro magnet 95. The circuit to the electro magnet 95 is as follows and includes the contacts 129—130, the conductor 132, the battery B′, and the conductor 133.

The energization of the electro magnet 95 in the uncalled substations causes the disk 74 to cause the lock 85 to engage the arm 80 and thus lock the arm so that should the receiver be lifted from the hook in such uncalled substation, the arm 80 cannot be raised and being held in a downward position effects the closure of contact 134—135 and consequently the shunt connection including the conductors 136—137, thus all uncalled substations are shunted from the line and are in reality "dead."

By the construction and arrangement of the selecting key, the various lock-out devices in the different substations, are placed out of the control or interference of the various subscribers, and are solely operable through the selecting key at the exchange, thus placing the various lock-out devices under the absolute control of the exchange operator so that when the calling and called substations are in communication, the uncalled substation cannot in any way interfere with the operation of the system.

What is claimed is:—

1. In a system of selective telephony, the combination of an exchange and a plurality of subscribers' instruments connected in a talking circuit, a selecting instrument at the exchange, and a shunt operating device in each subscriber's instrument influenced only by the selecting instrument to shunt the uncalled subscribers' instruments from the talking circuit and at the same time open all the transmitter circuits to the batteries in the instruments so shunted.

2. In a system of selective telephony, the combination of an exchange and a plurality of sets of subscribers' instruments connected for the transmission of intelligence, said exchange having manually operated means for selecting a subscriber's set and shunting the uncalled sets, and automatically operated means for signaling the called set, said selecting means being the sole instrumentality for selecting and signaling a called set, and for shunting the uncalled sets.

3. In a system of selective telephony, the combination of an exchange and a plurality of sets of subscribers' instruments connected for the transmission of intelligence, said exchange having means for selecting the desired set, signaling the same, and shunting all uncalled sets from the system, said selecting means being the sole instrumentality for selecting and signaling a called set, for shunting the uncalled sets, and for connecting all sets to the line for communication with the exchange.

4. In a system of selective telephony, the combination of an exchange and a plurality of sets of subscribers' instruments, each set having a transmitter, receiver, a call-up device and a receiver locking and shunting device, said exchange and sets being connected for the electrical transmission of speech, and mechanism mounted at the exchange and manually operated to connect any two of the subscribers' sets for communication, to operate the shunting devices in the remaining sets to isolate them from the line, and for automatically operating the call-up device of the set called, and auxiliary means mounted in said mechanism for repeating the signal.

5. In a system of selective telephony, the combination of an exchange and a plurality of subscribers' sets of instruments, including a transmitter, a receiver, a call-up alarm, a shunting device and a visual indicator, said exchange and subscribers' sets of instruments being in electrical communication, and mechanism mounted at the exchange and manually operated to connect any two of the subscribers' sets of instruments for communication, to operate the shunting devices and visual indicators in the remaining sets of instruments, and for automatically operating the call-up alarm of the set selected.

6. In a system of selective telephony, the combination of an exchange and a plurality of subscribers' sets of instruments, including each a shunting device, a visual indicator, a transmitter, a receiver and a call-up device, said exchange and subscribers' sets of instruments being in electrical communication, and a selecting device at the exchange for selecting any one set for connection with a calling set, said device automatically operating the call-up device in the selected set, giving a visual indication in all sets, and shunting all sets except the called and calling set.

7. In a telephone system, the combination with an exchange station having a selecting apparatus, of a series of subscribers' sets of instruments connected with the exchange station for the transmission of intelligence, each having a local battery circuit, a shunting device controlled from the exchange through the selecting apparatus, and a visual signal operable by said shunting device to indicate the condition of the local battery circuit relatively to the transmitting circuit.

8. In a selective system of telephony, the combination of an exchange and a plurality of sets of subscribers' instruments connected electrically for the transmission of intelligence, a manually operated selecting device in the exchange and connected in the line, a receiver hook lock in each subscriber's set, means controlled by the selecting device to cause said lock to be engaged or freed, and a shunting connection with the line at each subscriber's set controlled by said lock, whereby when two sets are connected for communication all of the other receiver hooks are locked and the sets are shunted from the line.

9. In a selective system of telephony, the combination of an exchange and a plurality of sets of subscribers' instruments connected electrically for the transmission of intelligence, a manually operated selecting device in the exchange and connected in the line, a receiver hook lock in each subscriber's set, means controlled by the selecting device to cause said lock to be engaged or freed, a shunting connection with the line at each subscriber's set controlled by said lock, whereby when two sets are connected for communication all of the other receiver hooks are locked and the sets are shunted from the line, and a signal device controlled by each lock controlling means to indicate the line condition of its respective subscriber's set.

10. In a selective system of telephony, the combination of an exchange, and a plurality of sets of subscribers' instruments connected electrically for the transmission of intelligence, a manually operated selecting device in the exchange and connected in the line, a receiver hook lock in each subscriber's set, means controlled by the selecting device to cause said lock to be engaged or freed, and a shunting connection with the line at each subscriber's set controlled by said lock, whereby when two sets are connected for communication all of the other sets are shunted from the line.

11. In a selective system of telephony, the combination of an exchange, and a plurality of sets of subscribers' instruments connected electrically for the transmission of intelligence, a manually operated selecting device in the exchange and connected in the line, a receiver hook lock in each subscriber's set, means controlled by the selecting device to cause said lock to be engaged or freed, a shunting connection with the line at each subscriber's set controlled by said lock, whereby when two sets are connected for communication all of the other sets are shunted from the line, and a signal device controlled by each lock controlling means to indicate the line condition of its respective subscriber's set.

12. A selective system of telephony, having an exchange, and a plurality of subscribers' sets of instruments connected electrically for the transmission of intelligence, a selecting device at the exchange, a lock out device in each subscriber's set influenced by the selecting device, a shunt connection with the line at each subscriber's set actuated by the lock out device, and a signal device in each subscriber's set, the placing into communication of two subscribers' sets, actuating all signal devices to indicate their condition relatively to the line while the shunt connections in all other sets than the calling and called sets are closed and the instruments shunted from the line.

13. In a system of selective telephony, the combination of an exchange and a plurality of subscribers' instruments connected in a talking circuit, a selecting instrument at the exchange, and a shunt operating and receiver hook locking device in each subscriber's instrument influenced only by the selecting instrument to shunt the uncalled subscribers' instruments from the talking circuit.

14. In a system of selective telephony, the combination of an exchange and a plurality of sets of subscribers' instruments connected for the transmission of intelligence and including a line shunt, a receiver hook lock and a device for controlling the shunt and receiver hook lock, said exchange having manually operated means for selecting a subscriber's set and shunting the uncalled sets, said selecting means being the sole instrumentality for selecting a called set, and for simultaneously operating the line shunts and receiver hook locks of the uncalled sets.

15. In a system of selective telephony, the combination of an exchange station and a plurality of substations connected for the electrical transmission of intelligence, each substation having a transmitter, a receiver, a call-up device and a receiver hook-locking and shunting device, and manually operated means mounted at the exchange station for connecting any two of the substations for communication and for operating the shunting devices in the remaining substations to isolate them from the line, and for automatically operating the call-up device in the called substation.

16. In a system of selective telephony, the combination of an exchange station and a plurality of substations connected for the electrical transmission of intelligence, each substation having a transmitter, a receiver, a shunting device, a receiver hook lock, and a visual indicator, and manually operated mechanism mounted at the exchange station and being the sole instrument to connect any two of the substations for communication, and to operate the shunting devices and receiver hook locks in the remaining substations, and the visual indicators in all substations.

17. In a selective system of telephony, the combination of an exchange station and a plurality of substations connected electrically for the transmission of intelligence, a manually operated selecting device in the exchange and connected to the line, a receiver hook lock at each substation, and a shunting connection with the line at each substation and means at each substation controlled by the selecting device, whereby any two substations may have their shunting connections opened while the remaining substations have their shunting connections closed and the receiver hooks locked.

In testimony whereof, I affix my signature to the foregoing.

RUBEN C. M. HASTINGS.

Copies of this patent may be obtained for five cents each, by addressing the "Commissioner of Patents, Washington, D. C."